Nov. 24, 1942.　　　A. L. GRISÉ　　　2,302,766
HOSE NOZZLE
Filed Feb. 15, 1941　　　2 Sheets-Sheet 1
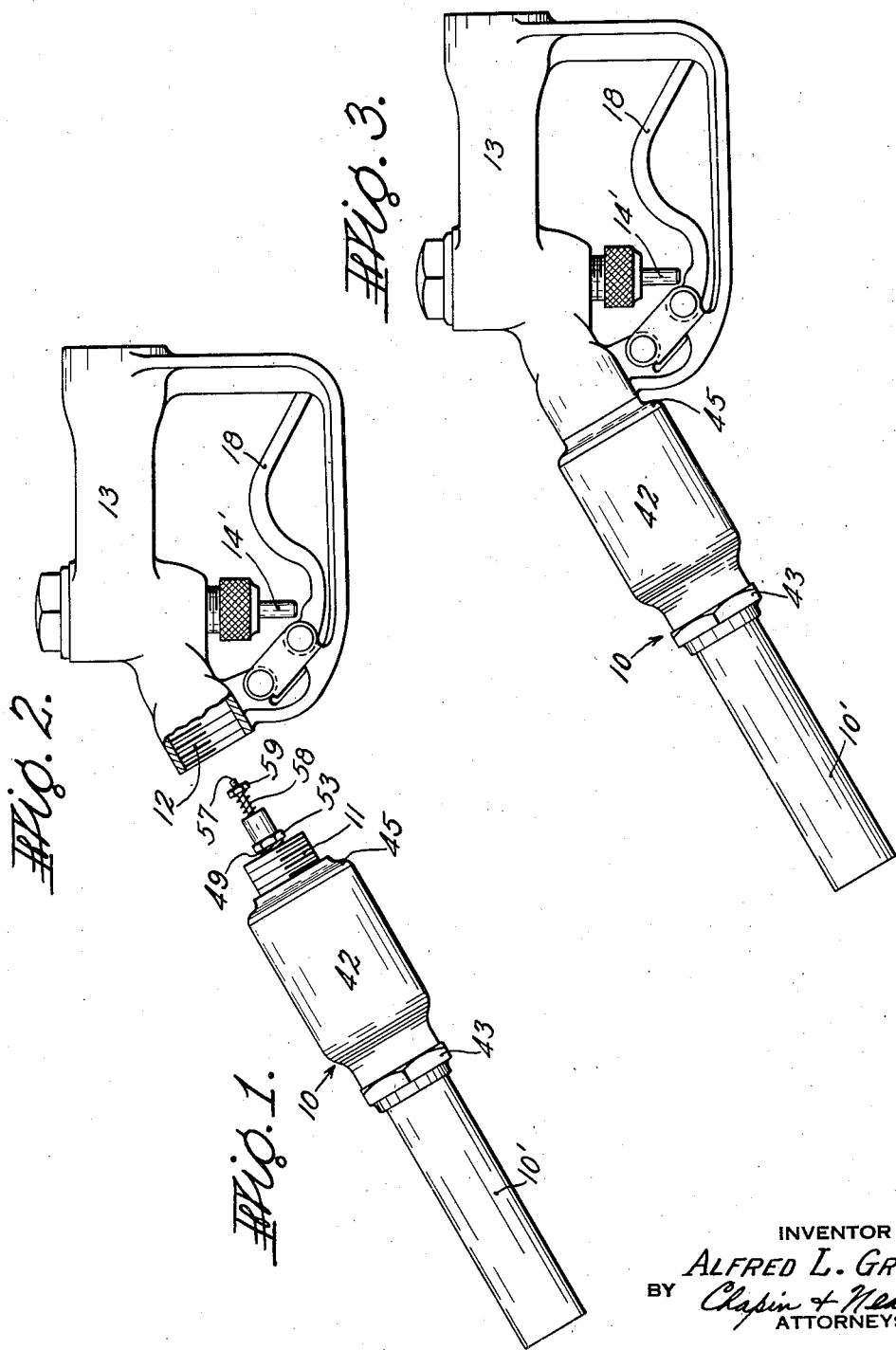
INVENTOR
ALFRED L. GRISÉ
BY Chapin + Neal
ATTORNEYS Nov. 24, 1942.  A. L. GRISÉ  2,302,766
HOSE NOZZLE
Filed Feb. 15, 1941  2 Sheets-Sheet 2
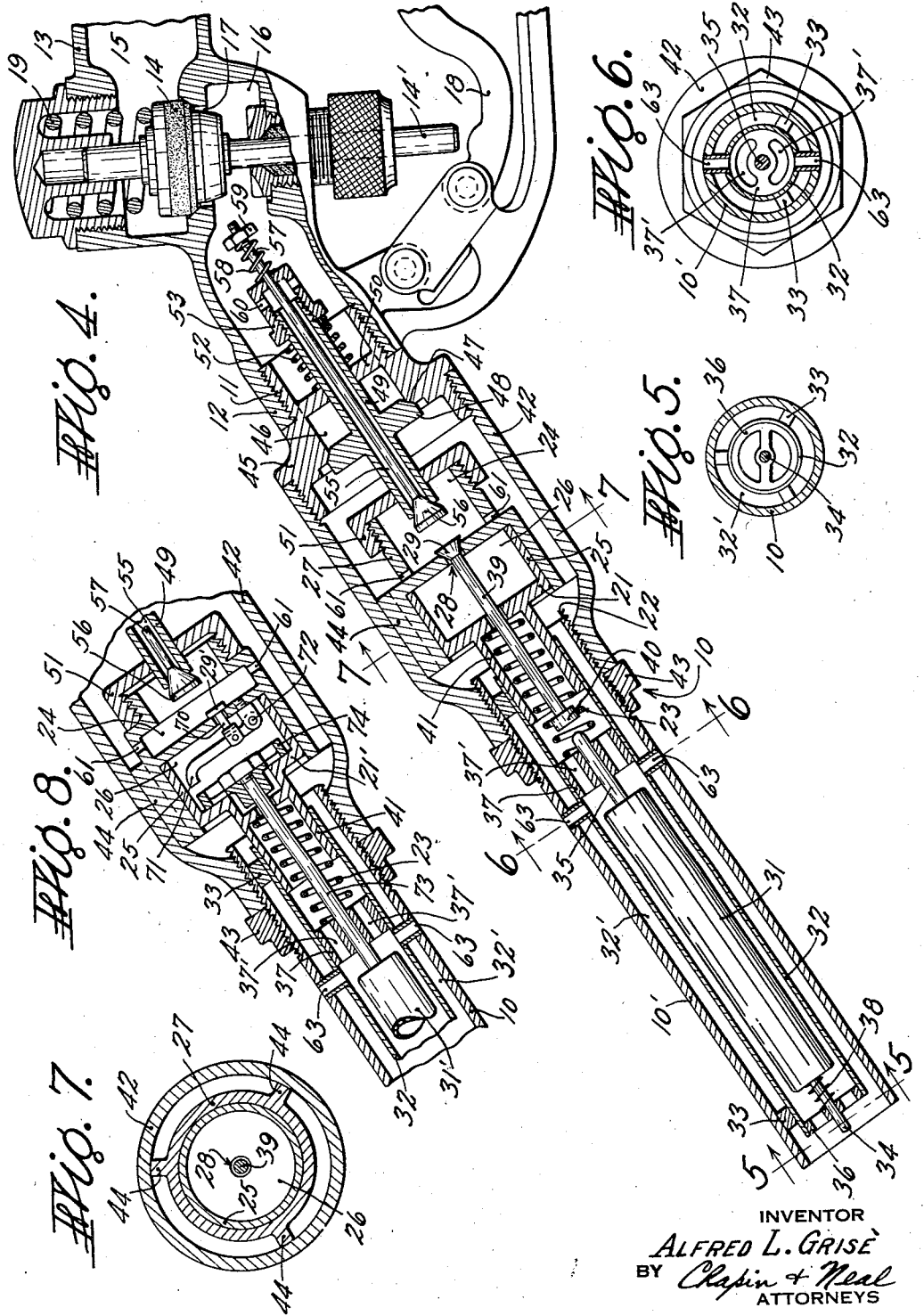
INVENTOR
ALFRED L. GRISÉ
BY Chapin + Neal
ATTORNEYS Patented Nov. 24, 1942

2,302,766

UNITED STATES PATENT OFFICE 2,302,766

HOSE NOZZLE

Alfred L. Grisé, Springfield, Mass., assignor to Gilbert & Barker Manufacturing Company, West Springfield, Mass., a corporation of Massachusetts Application February 15, 1941, Serial No. 379,028

12 Claims. (Cl. 226—127)

This invention relates to automatic shut-off valves. The valve of this invention is intended and particularly suitable for use in connection with the hose nozzle of a gasoline dispensing apparatus, for the purpose of automatically shutting off the flow when the tank is full.

Hose nozzles, having automatic shut-off valves, have been provided heretofore and my invention relates to an improved automatic shut-off valve for the purpose described.

The improvement is in the structure, arrangement, and mode of operation shown and indicated in the accompanying drawings. The features of invention will be best understood from the following disclosure and annexed claims.

In the drawings:

Fig. 1 is an exterior elevational view of a spout-like casing which contains the automatic shut-off valve and which is adapted to be screwed into the body of a hose nozzle, containing the usual hand-operated valve;

Fig. 2 is a similar view of the body casing of the hose nozzle;

Fig. 3 is a similar view showing, in assembled relation, the two units shown separately in Figs. 1 and 2;

Fig. 4 is a fragmentary sectional elevation drawn to a larger scale and showing in full detail the automatic shut-off valve structure;

Figs. 5, 6 and 7 are cross sectional views taken on the lines 5—5, 6—6, and 7—7, respectively, of Fig. 4; and Fig. 8 is a fragmentary sectional elevation showing another form of float-operated means for controlling the operation of the automatic shut-off valve.

Referring to these drawings, the automatic shut-off valve structure is mounted in a casing 10 of tubular pipe-like form, shown separately in Fig. 1. This assembled unit can be substituted for the ordinary spout found at the end of most hose nozzles used in gasoline dispensing equipment. The upper threaded end 11 of casing 10 is simply screwed into the interiorly threaded opening 12 (Fig. 2), where the usual spout is ordinarily attached to the casing 13 for the hand-operated flow-control valve 14 of the hose nozzle. According to the preferred arrangement, the casing 13 of the hand-operated valve and its contents are not, or at least need not be changed in any way.

Since the automatic shut-off apparatus is contained by and wholly within the spout assembly 10 of Fig. 1, it may readily be combined as shown in Fig. 3 with the old hand-valve casing 13 of any nozzle. One simply removes the old spout and substitutes the new spout 10 with the automatic valve contained therein. This saves expense, both in the factory and in the field whenever the automatic shut-off function is wanted.

Referring to Fig. 4, the casing 13 has the usual inlet and outlet passages 15 and 16, respectively, communicating by a hole 17 when the hand valve 14 is opened, as it may be by raising the lever 18 which engages and moves the stem 14' of said valve. A spring 19 tends to move valve 14 to its seat when pressure on hand lever 18 is relaxed, thus closing off communication between the inlet and outlet passages. The inlet passage is adapted for connection to the hose of a gasoline dispenser and the outlet passage, as above described, connects with the spout-like casing 10, containing the automatic shut-off valve.

The automatic shut-off valve is designated 21. It is power operated,—being moved away from its seat 22 by a spring 23 and being moved to its seat by hydraulic pressure. The pressure utilized for seating the valve is derived from the gasoline or other liquid flowing through the nozzle by diverting part of the flow into a pressure chamber 24 in a manner to be later described. Valve 21 is a piston valve and has an annular skirt 25 which is slidably mounted in a cylinder 26, formed in a tubular body 27, also containing the chamber 24. Communication between the chamber and cylinder is had by way of a passage 28, controlled by a valve 29, which is normally held to its seat in any suitable way, as by gravity. This valve 29 is opened by a float 31, whenever the tank being serviced becomes full.

The float 31 is mounted in and contained wholly within a tubular casing 32, supported in coaxial relation with and radially spaced from the thin tubular discharge spout end portion 10' of casing 10, as by two series of spider arms 33 (see also Figs. 5 and 6)—said series being located one near each end of the casing and each arm of each series being suitably fixed to one or both of the tubular elements,—the casing 32 and spout 10. The flow from the nozzle is through the space 32' between said spout and casing, whereby the float is shielded from and prevented from being moved by the stream of liquid flowing at high velocity through the hose nozzle. The float is suitably supported to slide axially in casing 32 as by stems 34 and 35 slidably mounted in spiders 36 and 37 (see also Figs. 5 and 6), respectively, fixed to the casing. In the normal position which the nozzle occupies during dispensing, gravity tends to move float 31 toward the outlet end of spout 10' into the position shown. Liquid rising into the spout from the tank being serviced will move the float in the opposite direction and operate valve 29. A light spring 38 is interposed between the lower end of the float and spider 34. This spring will be compressed to some extent by the weight of the float until liquid enters the casing 32 and starts to move the float. The spring accelerates the float in its initial movement. It also acts to cushion the float when it moves down in casing 32 into its lower position.

The valve 29 has a stem 39 which passes freely through the base of piston valve 21 with substantial clearance to enable the valve to automatically adjust it to its seat. Also, air is enabled to enter and vent cylinder 26 in a manner and for a purpose later to be described. Stem 39 extends into the upper end of float casing 32, terminating with a head 40 which is positioned to be engaged by the stem 35 of float 31 when the latter is moved axially inward and upward in its casing by the rising liquid.

The piston valve 21 has a tubular stem 41 which is telescopically and slidably engaged with the upper and inner end of float casing 32. The valve spring 23 is located within this tubular stem 41 and acts between the spider 37 and the base of the piston valve. The latter is adapted to engage as a seat with the inner end face of the thin tubular spout 10' which is threaded into one end of a tubular section 42 of casing 10 and thus axially adjustable therein. The spout 10' is fixed in adjusted position by means of a lock nut 43. This casing section 42 is slightly larger in diameter than the spout section 10' and contains within it the body 27, which is supported from it in coaxial and radially spaced relation by spider arms 44 (see also Fig. 7). The section 42 is connected at its upper end to one end of a connector nipple 45, which completes the casing 10 and which carries the above described threaded part 11 for connection to the nozzle body 13.

The connector 45 is provided with a passage 46 therethrough terminating with a seat 47 for a check valve 48. The stem 49 of this valve is slidably supported in part in a spider 50 formed in passage 46 and in part by the removable cap 51 of the pressure chamber 24. A spring 52 coiled around stem 49 acts between spider 50 and an adjustable abutment 53, threaded on the stem, to move valve 48 to and yieldingly hold it on its seat 47. Pressure of the liquid in the outlet passage 16 of the nozzle body will open valve 48, moving the latter in the direction of liquid flow into the hollow interior of the member 42.

A check valve, such as that just described, is often provided as a part of the hose nozzle of a gasoline dispenser. It is generally mounted in a casing which is interposed between the discharge spout and the body of the hose nozzle in much the same way as it is here. In case the nozzle has such a check valve, the latter is removed along with the discharge spout because the above described check valve takes its place.

The stem 49 of the check valve has a passage 55 extending axially therethrough and terminating at its discharge end with a seat for a small check valve 56 which opens in the direction of liquid flow into pressure chamber 24. The stem 57 of valve 56 extends through passage 55 and through the end of the cap nut 53. A spring 58 on stem 57 acts between nut 53 and an adjustable abutment, such as a nut 59, on stem 57, with a tendency to hold valve 56 closed. The nut 53 which is hollow, has passages 60 in its side, thereby affording constant communication between the outlet passage 16 of the hose nozzle and the passage 55. The spring 58 is so adjusted that, when the hand valve 14 is opened and liquid under pressure is admitted to outlet passage 16, the small check valve 56 will open before the large check valve 48 opens. Liquid under pressure thus enters and fills the pressure chamber 24. This chamber has one or more holes 61 in its side wall. The aggregate of the cross sectional areas of these holes is, however, less than the aggregate of the cross sectional areas of holes 60 so that there is a back pressure built up and maintained in chamber 24 and always available for use in moving the piston valve 21 to closed position when float 31 opens valve 29.

Provision is also made for venting the upper and inner end of the float casing 32 and incidentally certain parts of the automatic shut-off valve mechanism. One or more tubes 63 are provided to interconnect the interior of float casing 32 to the exterior of spout 10' at a location above the float. This enables air to leave the upper end of the float casing as liquid enters the lower end. But for this vent, the liquid which enters the lower end of casing 32 would trap and compress air therein and prevent proper action of the float. There are passages 37' through the spider 37 so that air may enter the hollow stem 39 of piston valve 21. This enables air to enter and leave the stem as valve 21 respectively opens and closes. As above described, there is ample clearance between stem 39 and the passage which receives it in the base of valve 21. Thus, air can enter into the cylinder 26 and liquid can leave it during the movement of the piston valve 24 back into its cylinder. The liquid displaced from the cylinder 26 can pass into the pressure chamber 24 from which it leaves by way of one or more of holes 61, the lower one of these holes insuring complete drainage of the chamber. The upper hole 61 provides a vent, communicating by way of the space between members 27 and 42 and the space 32' between spout 10' and casing 32 with the atmosphere.

A modification in the float-actuated mechanism for initiating operation of the automatic shut-off valve is shown in Fig. 8. The arrangement shown has the advantage of affording leverage, when and if needed, to multiply the force exerted by the rising float into a substantially greater force for opening the control valve, herein designated 29'. This valve is of disc form seating on the upper wall of cylinder 26 and having a short stem 70 which enters the cylinder and is pivotally connected to a lever 71 near one end thereof where it is fulcrumed as at 72. The float 31' has a single stem 73 slidably mounted in spider 37 and entering into cylinder 26. Fixed to stem 73, at the end inside cylinder 26, is a ring 74 adapted on rising of the float, to engage the free end of lever 71 and move it to open valve 29'. The piston valve 21' is essentially the same as valve 21 and differs only in the shape of its lower wall which is recessed to receive the hub of ring 74.

The operation will be understood from Fig. 4. The automatic shut-off operation is initiated by a small rise of float 32. The final result of this small rise is to automatically close valve 21 and stop the flow from the hose nozzle, independently of valve 14. The new mode of operation to attain this result will now specifically be described, The spout 10' of the nozzle extends into the fill opening or filler neck of a gasoline tank such as that of an automobile. With the hand valve 14 held open, the pressure flow from the pump hose, while filling the tank, does not contact with the float. It goes between spout 10 and casing 32 through passage 32'. Just before the tank is full, the liquid will back up into the lower end of casing 32,—the vents 63 releasing air from the upper end of the casing and thus enabling liquid to flow freely into the casing. The float rises quickly, preferably accelerated as described by spring 38. The rising float quickly opens control valve 29, thereby admitting liquid under pressure from chamber 24 into cylinder 26. Pressure in cylinder 26 moves piston valve 21 to and forces it against its seat 22. The service flow is then automatically stopped.

The pressure in chamber 24 is built up in this way. The liquid flows through holes 60 in cap-nut 53, thence down passage 55 in the hollow stem 49 and opens the small check valve 56 against the pressure of its spring 58, entering chamber 24. From this chamber the liquid cannot escape except by way of the bleed holes 61. These provide a total outlet area less than that afforded by holes 61. Thus the flow is choked and a back pressure is built up. Liquid under pressure is always available in chamber 24 and it is admitted into the cylinder 26 to operate the piston valve 21 whenever the float moves inwardly enough to open the control valve 29. The valve 21 will then be closed. When the flow is automatically stopped, the operator will ordinarily know it immediately. The stopping of the indicator of the meter will indicate the stopping of the flow. The ordinary operation then will be to close the hand valve 14, lift the nozzle to withdraw spout 10' from the tank, and hold it above the fill opening of the tank long enough to let the very small quantity in the casing 10 of the nozzle drain out. Air then enters the spout 10' of the nozzle both inside and outside the float casing 32, thus reducing to atmospheric the pressure on the exposed outer face of valve 21. Air can leak into cylinder 26 and liquid can leak out around stem 39, reducing the pressure therein to the point where spring 23 can open valve 21, whereupon additional liquid will drain from the nozzle. When the pressure is relieved sufficiently, the check valves 48 and 56 will close and all liquid below these closed check valves will drain out. The cylinder 26 can drain into casing 32 and the pressure chamber 24 can drain through the lower hole 61, into casing 42 and thence into the spout 10'. The parts are then restored to their normal and illustrated positions.

It should be particularly noted that when the hand valve 14 is not entirely closed but held partially open for a reduced flow, the apparatus will nevertheless automatically close valve 21 whenever the tank is full. This is because of the arrangement whereby sufficient pressure to do the work is built up in chamber 24 before there can be any discharge of liquid from the hose nozzle. The small check valve 56 opens first and admits liquid to chamber 24 before the large check valve 48 opens. No matter how small may be the flow past valve 14, the liquid will be held from passing out of the outlet passage 16 by valve 48 until the liquid has filled the passage and been placed under sufficient pressure to open valve 56. This pressure acting on the relatively large area of piston valve 21, results in a total force adequate to close valve 11 against the force exerted by spring 23. Whatever the rate of flow may be, liquid under sufficient pressure for the purpose will be available in the chamber 24 before there can be any flow from the nozzle. The rate of flow may vary widely under the hand control of the nozzle valve 14 at the will of the operator and for other reasons. No matter to what extent the rate of flow is decreased, the automatic shut-off valve will operate for the reason, above set forth, that the necessary valve closing force is built up as a prerequisite to flow from the nozzle. This is not true of some prior art devices made to depend for operation on the rate of flow being at a sufficient speed to create a suction effect on a diaphragm.

Sometimes the operator blocks the hand valve lever to stay in open position while he wipes the windshield. In that case the delivery will automatically stop upon the tank filling. Sometimes an operator instinctively lowers the rate of delivery if someone talks to him. In that case the delivery rate is not enough to operate some of the automatic valve in the prior art. But my apparatus operates in both cases mentioned. Furthermore, my apparatus has practical identity in outside appearance with the usual hose nozzle. The simple spout-like casing 10 contains all the automatic shut-off valve structure. The nozzle has all the advantages of the prior art nozzles and adds the automatic stop function in every operating situation and under all usual operating conditions.

Having disclosed my invention in the best form known to me, it will be obvious that the structure, mode of operation, and results of the invention may be attained in other forms. The invention involved is pointed out in the following claims.

What I claim is:

1. A float controlled nozzle apparatus, comprising in combination, a nozzle casing forming a spout, and having a passage provided with a valve seat, a valve engageable with said seat, a cylinder and piston to close said valve on its seat, spring means to open said valve, a float in the nozzle spout, an inlet valve for said cylinder, means operated by the float to open said inlet valve, said cylinder being put into communication with the pressure due to the liquid when said inlet valve is opened, whereby the piston operated valve is closed automatically on rising of the float.

2. A hose nozzle, comprising a casing having an inlet and an outlet and a passage interconnecting the inlet and outlet and provided with three valve seats at longitudinally spaced locations, a hand-operated valve cooperating with the valve seat nearest said inlet, an automatic shut-off valve cooperating with the valve seat nearest the outlet, a check valve cooperating with the intermediate valve seat and opening only after the hand operated valve has been opened and the liquid has been placed under a predetermined pressure, hydraulic means for closing said shut-off valve, spring means for opening said shut-off valve, said casing having a supply passage for pressure fluid to actuate said hydraulic means, said supply passage leading from the first-named passage at a location between the hand valve and check valve to said hydraulic means, a check valve in the supply passage opening only after the liquid has reached a predetermined pressure less than the first-named pressure and a float-operated control valve for admitting liquid from the supply passage to said hydraulic means when the tank being serviced by the nozzle is full.

3. A hose nozzle, comprising a casing having an inlet and an outlet and a passage interconnecting the inlet and outlet and provided with three valve seats at longitudinally spaced locations, a hand-operated valve cooperating with the valve seat nearest said inlet, an automatic shut-off valve cooperating with the valve seat nearest the outlet, a check valve cooperating with the intermediate valve seat and opening only after the hand-operated valve has been opened and the liquid placed under predetermined pressure, hydraulic means for closing said shut-off valve, spring means for opening the shut-off valve, said hydraulic means having a chamber for containing pressure fluid to operate said hydraulic means, a control valve normally closing off communication between said hydraulic means and chamber, a float in the outlet end of said passage operable to open the control valve, a second passage connecting the pressure chamber to the first passage at a point on the inlet side of said check valve, and a second check valve located in the second passage and opening in the direction of liquid flow only after a predetermined pressure less than the first-named pressure has been built up in the inlet end of said passage, said pressure chamber having an outlet opening into the first passage on the outlet side of the first check valve, the area of the last-named outlet being less than the area of the second passage at its most restricted part, whereby to choke the flow through the pressure chamber and build up a back pressure for operating said hydraulic means when required.

4. An automatic shut-off valve comprising, a casing having an inlet and an outlet and a passage connecting them together with a valve seat in said passage between the inlet and outlet, a valve engageable with said seat to shut off the flow through said passage, liquid-pressure operated means for moving said valve to its seat, said casing having a chamber therein for containing pressure liquid to operate said means, a control valve normally closing off communication between said means and chamber, a float in the outlet end of said passage operable to open the control valve, a check valve between said inlet and means, said check valve opening in the direction of flow only after a predetermined pressure has been built up in the inlet end of said passage, a second passage connecting the pressure chamber to the first passage at a point on the inlet side of said check valve, and a second check valve located in the second passage and opening in the direction of liquid flow only after a predetermined pressure less than the first-named pressure has been built up in the inlet end of said passage.

5. An automatic shut-off valve comprising, a casing having an inlet and an outlet and a passage connecting them together with a valve seat in said passage between the inlet and outlet, a valve engageable with said seat to shut off the flow through said passage, liquid-pressure operated means for moving said valve to its seat, said casing having a chamber therein for containing pressure liquid to operate said means, a control valve normally closing off communication between said means and chamber, a float in the outlet end of said passage operable to open the control valve, a check valve between said inlet and means, said check valve opening in the direction of flow only after a predetermined pressure has been built up in the inlet end of said passage, a second passage connecting the pressure chamber to the first passage at a point on the inlet side of said check valve, and a second check valve located in the second passage and opening in the direction of liquid flow only after a predetermined pressure less than the first-named pressure has been built up in the inlet end of said passage, said pressure chamber having an outlet opening into the first passage on the outlet side of the first check valve, the area of the last-named outlet being less than the area of the second passage at its most restricted part, whereby to choke the flow through the pressure chamber and build up a back pressure for operating said hydraulic means when required.

6. In a hose nozzle, a casing having a body portion with a hand-operated control valve therein and inlet and outlet passages leading to and from said valve and having also a spout portion for insertion in the fill opening of a tank to be serviced and communicating with said outlet passage, a tubular casing mounted within and spaced from the walls of said spout leaving therebetween a discharge passage, a cylinder also mounted within and spaced from the walls of said spout leaving a main flow passage therebetween, a piston valve in said cylinder operable to open and close communication between the main flow and discharge passages, said cylinder having a pressure chamber with an outlet into the cylinder, a control valve for the last-named outlet, a float in said tubular casing and shielded thereby from the liquid flow through the discharge passage when the piston valve is open, said float being operable when liquid enters the outlet end of the tubular casing to open said control valve; said casing having two passages leading from the first-named outlet passage one, a relatively small one, leading to the pressure chamber and the other, a relatively large one, leading to the main flow passage, and check valves one for each of the last-named passages opening successively as the liquid in the first-named outlet passage reaches predetermined pressures, the check valve for the smaller passage opening at a pressure lower than that at which the other check valve opens.

7. In a hose nozzle, a casing having a body portion with a hand-operated control valve therein and inlet and outlet passages leading to and from said valve and having also a spout portion for insertion in the fill opening of a tank to be serviced and communicating with said outlet passage, a tubular casing mounted within and spaced from the walls of said spout leaving therebetween a discharge passage, a cylinder also mounted within and spaced from the walls of said spout leaving therebetween a main flow passage, a piston valve in said cylinder operable to open and close communication between the discharge and main flow passages, said cylinder having a pressure chamber with an outlet into the cylinder, a control valve for the last-named outlet, said piston valve having a hollow stem telescoped with the inner end of the tubular casing, a venting conduit interconnecting said tubular casing near its inner end to the outside of the nozzle and thus to the atmosphere, a float in the tubular casing movable axially inwardly as liquid enters its outer end, means interconnecting the float and control valve for opening the latter as the float moves inwardly, said means extending loosely through the base of the piston valve leaving a vent space for air to enter the cylinder when the hand-operated valve is closed.

8. In a hose nozzle, a casing having a body portion with a hand-operated control valve therein and inlet and outlet passages leading to and from said valve and having also a spout portion for insertion in the fill opening of a tank to be serviced and communicating with said outlet passage, a tubular casing mounted within and spaced from the walls of said spout leaving therebetween a main flow passage, a cylinder also mounted within and spaced from the walls of said spout leaving therebetween a discharge passage, a piston valve in said cylinder operable to open and close communication between the discharge and main flow passages, said cylinder having a pressure chamber with one outlet into said cylinder and a second outlet into the main flow passage, a control valve for the outlet into said cylinder, a float in said tubular casing shielded thereby from the liquid flow in said discharge passage when the piston valve is open and operable to open said control valve when liquid enters the outlet end of the tubular casing; said casing having two passages leading from the first-named outlet passage one, a relatively small one, leading to the pressure chamber and the other, a relatively large one, leading to the main flow passage, and check valves one for each of the last-named passages opening successively as the liquid in the first-named outlet passage reaches predetermined pressures, the check valve for the smaller passage opening at a pressure lower than that at which the other check valve opens, the second-named outlet of said pressure chamber being restricted relatively to the inlet thereto whereby to create a back pressure in said chamber.

9. In a hose nozzle, having a hand-operated control valve and a discharge spout, an automatic shut-off valve located between the first valve and the discharge end of said spout, a float in said end of the spout, hydraulic means controlled by the rising of the float to close said shut-off valve, and means for trapping liquid after it leaves the first valve and placing it under pressure and diverting some of the liquid under pressure to said means for operating the second valve.

10. A hose nozzle, comprising a casing having an inlet and an outlet and a passage interconnecting the inlet and outlet and provided with three valve seats at longitudinally spaced locations, a hand-operated valve cooperating with the valve seat nearest said inlet, an automatic shut-off valve cooperating with the valve seat nearest the outlet, a check valve cooperating with the intermediate valve seat and opening only after the hand-operated valve has been opened and the liquid placed under predetermined pressure, hydraulic means for closing said shut-off valve, spring means for opening the shut-off valve, said hydraulic means having a chamber for containing pressure fluid to operate said hydraulic means, a control valve normally closing off communication between said hydraulic means and chamber, a float in the outlet end of said passage operable to open the control valve, a second passage connecting the pressure chamber to the first passage at a point on the inlet side of said check valve, said pressure chamber having an outlet opening into the first passage on the outlet side of the first check valve, the area of the last-named outlet being less than the area of the second passage at its most restricted part, whereby to choke the flow through the pressure chamber and build up a back pressure for operating said hydraulic means when required.

11. An automatic shut-off valve comprising, a casing having an inlet and an outlet and a passage connecting them together with a valve seat in said passage between the inlet and outlet, a valve engageable with said seat to shut off the flow through said passage, liquid-pressure operated means for moving said valve to its seat, said casing having a chamber therein for containing pressure liquid to operate said means, a control valve normally closing off communication between said means and chamber, a float in the outlet end of said passage operable to open the control valve, a check valve between said inlet and means, said check valve opening in the direction of flow only after a predetermined pressure has been built up in the inlet end of said passage, and a second passage connecting the pressure chamber to the first passage at a point on the inlet side of said check valve.

12. In a hose nozzle, a casing having a main body portion with a hand-operated control valve therein and inlet and outlet passages leading to and from said valve and having also a separable tubular spout portion one end of which is adapted for insertion in the fill opening of a tank to be serviced and the other end of which communicates with said outlet passage, said spout portion having intermediate its ends a valve seat, a valve cooperating with said seat, spring means for moving said valve away from its seat, fluid pressure means for moving said valve toward its seat, said last-named means including a cylinder mounted in said spout portion and spaced from the inner wall thereof to provide for passage of liquid between it and said wall, a piston in said cylinder connected to said valve, and control means located near the first-named end of said spout portion and actuated by the rising liquid when the liquid in said tank rises to a predetermined level to render said fluid pressure means effective to move said piston against said spring means.

ALFRED L. GRISÉ.